US012688458B2

(12) United States Patent
Bhandaru et al.

(10) Patent No.: US 12,688,458 B2
(45) Date of Patent: Jul. 21, 2026

(54) REGISTRY ENHANCEMENTS FOR JUST-IN-TIME COMPILATION OF MACHINE LEARNING MODELS

(71) Applicant: VMware LLC, Palo Alto, CA (US)

(72) Inventors: Malini Bhandaru, San Jose, CA (US); Jia Zou, Beijing (CN); Hai Ning Zhang, Beijing (CN); Anthea Jung, Jersey City, NJ (US)

(73) Assignee: VMware LLC, Palo Alto, CA (US)

( * ) Notice: Subject to any disclaimer, the term of this patent is extended or adjusted under 35 U.S.C. 154(b) by 1015 days.

(21) Appl. No.: 17/819,077

(22) Filed: Aug. 11, 2022

(65) Prior Publication Data

US 2024/0020572 A1     Jan. 18, 2024

(30) Foreign Application Priority Data

Jul. 14, 2022    (WO) ................ PCT/CN2022/105613

(51) Int. Cl.
| | |
|---|---|
| *G06F 8/41* | (2018.01) |
| *G06F 16/28* | (2019.01) |
| *G06N 20/00* | (2019.01) |

(52) U.S. Cl.
CPC .............. *G06N 20/00* (2019.01); *G06F 8/41* (2013.01)

(58) Field of Classification Search
CPC .................................. G06N 20/00; G06F 8/41
See application file for complete search history.

(56) References Cited

U.S. PATENT DOCUMENTS

| | | | | |
|---|---|---|---|---|
| 9,134,975 | B1 * | 9/2015 | Beavin ...................... | G06F 8/65 |
| 10,698,667 | B2 * | 6/2020 | Hodaei ...................... | G06F 8/41 |
| 10,698,668 | B1 * | 6/2020 | Pohlack .................... | G06F 8/71 |
| 11,657,069 | B1 * | 5/2023 | Narayanaswamy ... | G06N 20/20 |
| | | | | 707/602 |
| 2004/0054800 | A1 * | 3/2004 | Shah .................... | H04L 67/1095 |
| | | | | 709/240 |
| 2014/0282439 | A1 * | 9/2014 | Kannan ..................... | G06F 8/76 |
| | | | | 717/140 |
| 2019/0391796 | A1 * | 12/2019 | Brady ..................... | G06F 8/458 |
| 2021/0112038 | A1 * | 4/2021 | Karame ................... | G06N 3/08 |
| 2023/0419162 | A1 * | 12/2023 | Appel .................... | G06N 20/00 |

* cited by examiner

*Primary Examiner* — S. Sough
*Assistant Examiner* — Mohammad H Kabir
(74) *Attorney, Agent, or Firm* — King Intellectual Asset Management

(57) ABSTRACT

The disclosure provides an approach for dynamic centralized model compilation. Embodiments include receiving, from a client, a request for a machine learning model, wherein the request indicates either one or more attributes comprising one or more of a hardware characteristic, a target precision, or a compiler characteristic, or that one or more default behaviors should be used to compile the machine learning model. Embodiments include determining a compiler for the machine learning model based on the one or more attributes or the one or more default behaviors, wherein the compiler is stored in a registry. Embodiments include compiling the machine learning model using the compiler. Embodiments include providing the compiled machine learning model to the client in response to the request.

20 Claims, 4 Drawing Sheets

100

Client Device
120

Network
110

Server 130

Registry 140

Uncompiled Models 144

Compilers 146

Policy Store 148

Background Tasks 150

Compiled
Models
142

Dynamic
Model
Engine
152

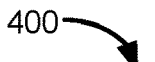

400

402

RECEIVE, FROM A CLIENT, A REQUEST FOR A MACHINE LEARNING MODEL, WHEREIN THE REQUEST SPECIFIES EITHER: ONE OR MORE ATTRIBUTES COMPRISING ONE OR MORE OF: A HARDWARE CHARACTERISTIC; A TARGET PRECISION; OR A COMPILER CHARACTERISTIC; OR THAT ONE OR MORE DEFAULT BEHAVIORS SHOULD BE USED TO COMPILE THE MACHINE LEARNING MODEL

404

DETERMINE A COMPILER FOR THE MACHINE LEARNING MODEL BASED ON THE ONE OR MORE ATTRIBUTES, WHEREIN THE COMPILER IS STORED IN A REGISTRY

406

COMPILE THE MACHINE LEARNING MODEL USING THE COMPILER

408

PROVIDE THE COMPILED MACHINE LEARNING MODEL TO THE CLIENT IN RESPONSE TO THE REQUEST

FIG. 4

REGISTRY ENHANCEMENTS FOR JUST-IN-TIME COMPILATION OF MACHINE LEARNING MODELS

CROSS-REFERENCE TO RELATED APPLICATIONS

This application claims priority to International Patent Application No. PCT/CN/2022/105613, filed Jul. 14, 2022, entitled "REGISTRY ENHANCEMENTS FOR JUST-IN-TIME COMPILATION OF MACHINE LEARNING MODELS", and assigned to the assignee hereof, the contents of each of which are hereby incorporated by reference in its entirety.

BACKGROUND

Machine learning is becoming increasingly prevalent in computing technology. Machine learning models are trained and used for a wide array of purposes, such as object detection, content recommendation, prediction of user behavior, and/or the like. In some computing environments, machine learning models may be maintained in a centralized data structure, such as a data store or registry, from which they can be retrieved by applications for various purposes.

There are many ways in which machine learning models can be optimized for particular applications, devices, and uses. For example, a model may be configured in such a manner as to favor either accuracy or performance depending on the computing system on which the model is to run. In another example, a model may be configured with parameters that correspond to a particular framework, particular hardware, a particular platform and/or the like. However, existing techniques for centralized storage and serving of machine learning models do not generally take into account these opportunities for optimization.

BRIEF DESCRIPTION OF THE DRAWINGS

FIG. 4 depicts example operations related to dynamic centralized model compilation.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
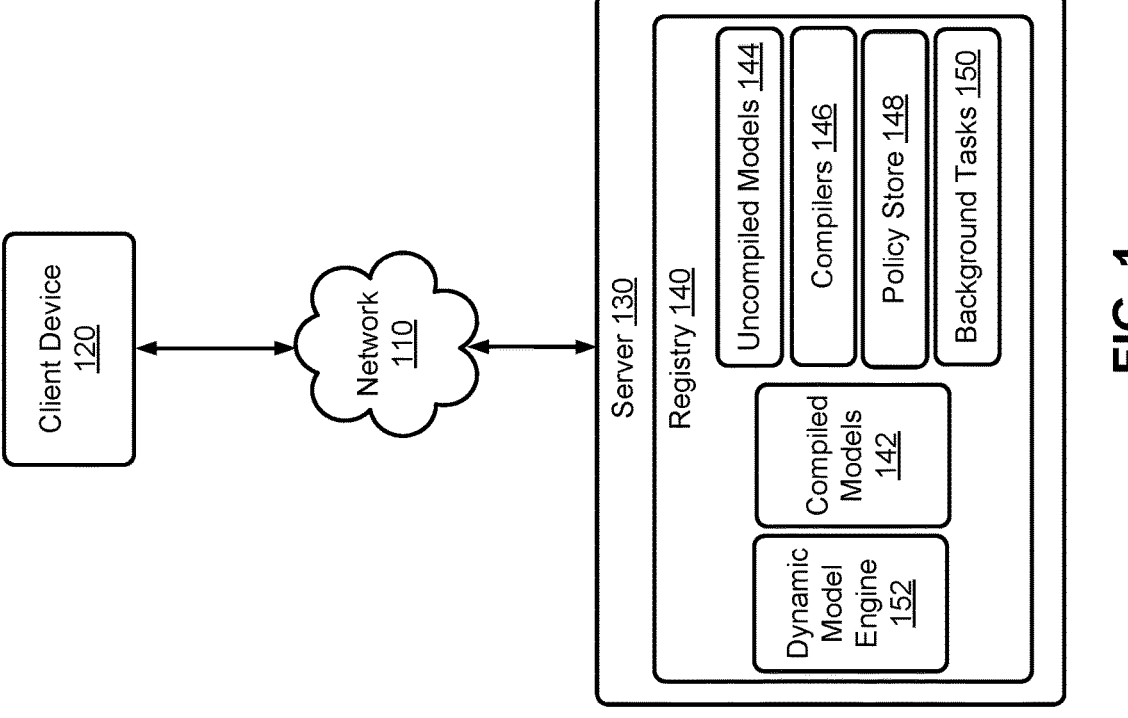
FIG. 1 illustrates an example related to dynamic centralized model compilation.

The present disclosure provides an approach for dynamic centralized model compilation. For example, embodiments described herein involve storing compilers in a centralized registry so that machine learning models may be dynamically compiled based on particular attributes related to model requests from applications.

Machine learning models are generally trained or otherwise generated based on a data set to output a target value in response to one or more input values. There are many types of machine learning models that may be used for a wide variety of purposes, and embodiments of the present disclosure are not limited to any particular types of machine learning models. A given machine learning model may be compiled in a variety of different ways for optimal performance with respect to particular applications, devices, platforms, uses, and/or the like. In some cases, different compilers may be available for compiling a machine learning model for different purposes and contexts.

According to certain embodiments, as described in more detail below with respect to FIGS. 1-4, an enhanced registry stores model compilers in association with metadata indicating attributes of the compilers. In an example, an administrator of a computing environment (e.g., a data center, cloud environment, network, and/or the like) adds the compilers and metadata to the registry. The registry also stores un-compiled models that can be compiled using the stored compilers. When a client in the computing environment requires the use of a model, the client submits a request to the registry for the model, such as via an application programming interface (API) exposed by the registry, and the request may specify one or more attributes such as one or more hardware-related attributes, a target precision for the model, a specific compiler, and/or the like. Examples of hardware-related attributes include types of processors, amounts of available processing and/or memory resources, whether a graphics processing unit (GPU) is available, types of hardware platforms, and/or the like. A target precision may be an amount of accuracy or precision that is requested for a model (e.g., corresponding to one or more configurable parameters related to model compilation). In many cases there is a tradeoff between precision and resource-efficiency such that a higher amount of precision requires a higher amount of computing resource consumption. In some embodiments, the registry dynamically compiles the requested model based on the one or more attributes specified in the request. For instance, the registry may select a particular compiler for compiling the model based on a correspondence between the one or more attributes specified in the request and metadata associated with the particular compiler in the registry (e.g., based on compiler attributes input to the registry by a user such as an administrator of the computing environment).

The registry returns the compiled model to the client in response to the request, and the client utilizes the compiled model for its intended purpose (e.g., performing object detection, content recommendation, anomaly detection, or another machine learning task). In certain embodiments, the registry stores the compiled model along with metadata that indicates the one or more attributes specified in the request so that the compiled model may be provided in response to subsequent similar requests (e.g., requests specifying some or all of the same attributes). For example, the compiled model may be stored in the registry for a given amount of time, until a new version of the model or compiler is added to the registry, and/or until one or more other conditions occur (e.g., as specified in a policy).

In certain embodiments, a service (e.g., a background task) running in association with the registry may determine when updated versions of models and/or compilers are added to the registry and, in such cases, may cause models to be re-compiled and sent to clients that previously requested the models and/or stored for sending to clients in response to subsequent requests. Thus, the registry may ensure that compiled models are kept up to date based on the latest available data.

Techniques described herein constitute a technical improvement with respect to centralized management of machine learning models by allowing models to be dynamically compiled on demand in an optimized manner for particular requests. Thus, rather than merely storing pre-compiled models in a registry and providing the previously-compiled models to clients upon request in a generic manner, embodiments of the present disclosure allow models to be optimized for particular purposes and computing components, thereby improving performance of the models when executed on client devices. Furthermore, by compiling models only upon demand, rather than compiling all models as soon as compilers and/or models become available, techniques described herein avoid unnecessary utilization of storage resources associated with storing compiled models that are not being used.

Additionally, in some cases, by utilizing policies for removing and/or updating compiled models in storage based on conditions such as the passage of time and/or updated versions of models and/or compilers becoming available, techniques described herein ensure that models are kept up to date and that storage resources are not unnecessarily expended on compiled models that are being used infrequently.

FIG. 1 is an illustration 100 of an example related to dynamic centralized model compilation.

In illustration 100, a server 130 and a client device 120 are connected via a network 110. Network 110 may, for example, be a local area network (LAN), a wide area network (WAN), and/or the like. In certain embodiments, server 130 and client device 120 are both located within a networking environment, such as a data center, cloud, and/or the like, while in other embodiments server 130 and client device 120 are located in different networking environments. Server 130 and client device 120 may each be computing devices with one or more processors, memory, and/or the like, and/or may be implemented as software running on one or more physical computing devices with one or more processors, memory, and/or the like. Client device 120 generally represents a computing device (e.g., desktop or laptop computer, mobile device, virtual computing instance, and/or the like) on which one or more machine learning models are utilized by one or more applications. For example, as described in more detail below with respect to FIG. 2, client device 120 may send a request for a machine learning model to server 130 via network 110, and server 130 may respond with a compiled machine learning model based on the request.

Server 130 comprises registry 140, which generally represents a machine learning model registry according to embodiments of the present disclosure. In alternative embodiments, registry 140 is remote from server 130 (e.g., server 130 may communicate with registry 140 over a network). Registry 140 may, for example, be a container registry that is enhanced to perform functionality described herein, as container registries allow for storage of "blob"/ binary data in association with metadata. Registry 140 comprises a dynamic model engine 152 that performs operations related to dynamic compilation of models based on requests. For example, dynamic model engine 152 may perform operations 400 of FIG. 4, described below. Registry 140 further comprises compiled models 142, which represent models that have been compiled in response to requests and stored (e.g., with metadata as described with respect to FIG. 3) for providing in response to subsequent requests.

Registry 140 further comprises uncompiled models 144, compilers 146, policy store 148, and background tasks 150. Uncompiled models 144 include machine learning models, such as in the form of non-executable code (e.g., source code), that have not yet been compiled into executable programs. Compilers 146 include software applications that compile machine learning models. As described in more detail below with respect to FIG. 3, compilers 146 may be associated with metadata indicating attributes of the compilers for use in dynamically selecting a compiler 146 for compiling a given uncompiled model 144 in response to a request (e.g., from client device 120) bases on attributes associated with the request. Examples of compilers include Open Visual Interface and Neural Network Optimization (VINO), Apache® Tensor Virtual Machine (TVM), OctoML®, and others.

Policy store 148 generally stores policies associated with registry 140, such as defaults (e.g., for cases where a request does not include attributes or where no compiler matching attributes in a request is available), replacement/removal policies (e.g., indicating conditions under which stored compiled models should be deleted or re-compiled), and/or the like.

Background tasks 150 generally include services that perform additional functionality related to registry 140, such as monitoring for updated versions of uncompiled models 144 and/or compilers 146 and performing actions based on the updated versions, such as triggering re-compilation of models, removing previously-compiled models, storing re-compiled models, transmitting re-compiled models to clients based on earlier requests, and/or the like.

It is noted that the components depicted in illustration 100 are included as examples, and functionality described herein may be performed by one or more additional or fewer components, located on the same and/or different computing devices.

Figure 2:
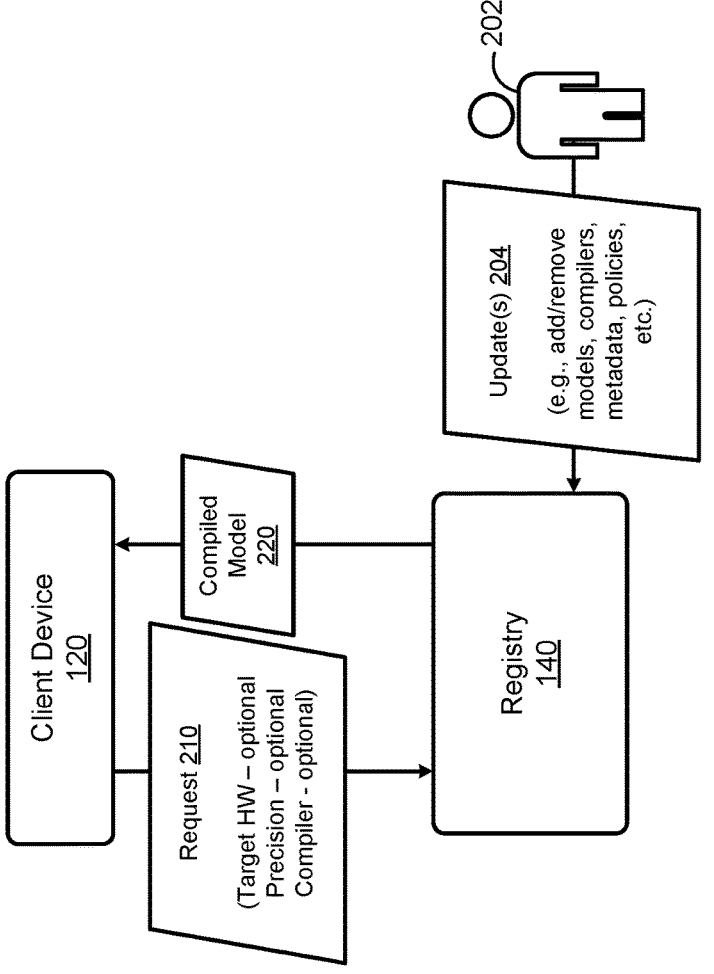
FIG. 2 illustrates another example related to dynamic centralized model compilation.

FIG. 2 is an illustration 200 of another example related to dynamic centralized model compilation. Illustration 200 includes client device 120 and registry 140 of FIG. 1.

Client device 120 sends a request 210 for a machine learning model to registry 140, such as via a call to an application programming interface (API) exposed by registry 140. Request 210 may specify certain optional attributes, such as target hardware (e.g., indicating attributes of the hardware on which the model is to be executed on client device 120), a precision, a compiler, and/or the like. These attributes are included as examples, and others are possible, such as an operating system type and/or version, an application type and/or version, and/or the like. Request 210 also indicates the machine learning model and/or type of machine learning model that is requested.

Upon receiving request 210, registry 140 may first determine whether there is a previously-compiled model stored in registry 140 that corresponds to the attributes associated with request 210. If such a previously-compiled model is stored in registry 140, then registry 140 may return that previously-compiled model to client device 120 in response to request 210 as compiled model 220. If there is no previously-compiled model corresponding to the attributes associated with request 210 in registry 140, then registry 140 dynamically selects a compiler for compiling a machine learning model based on request 210.

For example, registry 140 may determine whether a compiler stored in registry 140 is associated with metadata indicating that it corresponds to one or more of the attributes associated with request 210. If there is no compiler that matches all of the attributes associated with request 210, registry 140 may select a compiler that matches a highest number of the attributes or one or more of the attributes that are considered most important (e.g., based on an indication of importance of the attributes included in request 210 or based on one or more policies configured for registry 140). If there are no compilers that match any of the attributes, then registry 140 may select a compiler based on configured defaults (e.g., indicated in one or more policies).

Registry 140 may compile a model using the selected compiler based on request 210. Once compiled, registry 140 sends the compiled model 220 to client device 120 in response to request 210. Registry 140 may also store compiled model 220 so that it can be provided in response to subsequent requests from client device 120 and/or other clients. In some embodiments, one or more policies govern storage of compiled model 220, such as indicating that compiled model 220 should be removed from registry 140 if a certain amount of time passes since compiled model 220 was last requested. In another example, a policy may indicate that compiled model 220 should be re-compiled if an updated version of the model or compiler is added to registry 140.

Client device 120 may use compiled model 220 to perform one or more actions. For example, an application running on client device 120 may provide inputs to compiled model 220 and receive outputs from compiled model 220 for use in performing operations such as object detection, content recommendation, behavior prediction, anomaly detection, and/or the like. Compiled model 220 may perform optimally on client device 120 because it was dynamically compiled in an optimized manner for execution on client device 120 based on request 210. For example, if client device is an Internet of things (IoT) device with limited memory and/or processing capabilities, compiled model 220 may be optimized for utilizing smaller amounts of memory and/or processing resources (e.g., with a lower precision).

A user 202 (e.g., of server 130 of FIG. 1) may provide one or more updates 204 to registry 140, such as to add, remove, and/or modify models, compilers, metadata, policies, and/or the like. For example, user 202 may interact with a user interface associated with registry 140 to provide updates 204, such as uploading models and/or compilers, entering metadata and/or policies, and/or the like. In an example, user 202 provides an update 204 by which user 202 uploads a new compiler and enters metadata specifying one or more attributes of the compiler. In another example, user 202 provides an update 204 setting a default compiler for use when a compiler corresponding to attributes associated with a request is not available in registry 140. Additional examples of metadata and policies are described with respect to FIG. 3.

In some embodiments, registry 140 may store a record of request 210, and may send an updated version of compiled model 220 to client device 120 based on request 210 if an updated version of the model and/or compiler is added to registry 140 (e.g., via one or more updates 204). For example, a background service associated with registry 140 may monitor for updated models and/or compilers, and may re-compile models as appropriate (e.g., based on policies added via one or more updates 202), such as storing and/or sending re-compiled models to clients that previously requested the models. In another example (e.g., which may correspond to a policy), if a new compiler is added to the registry that is a better match for a previous request (e.g., a new compiler that matches more attributes associated with the previous request than a compiler that was previously provided in response to the previous request), the model may be re-compiled with the new compiler and stored and/or sent to the client that sent the previous request.

Figure 3:
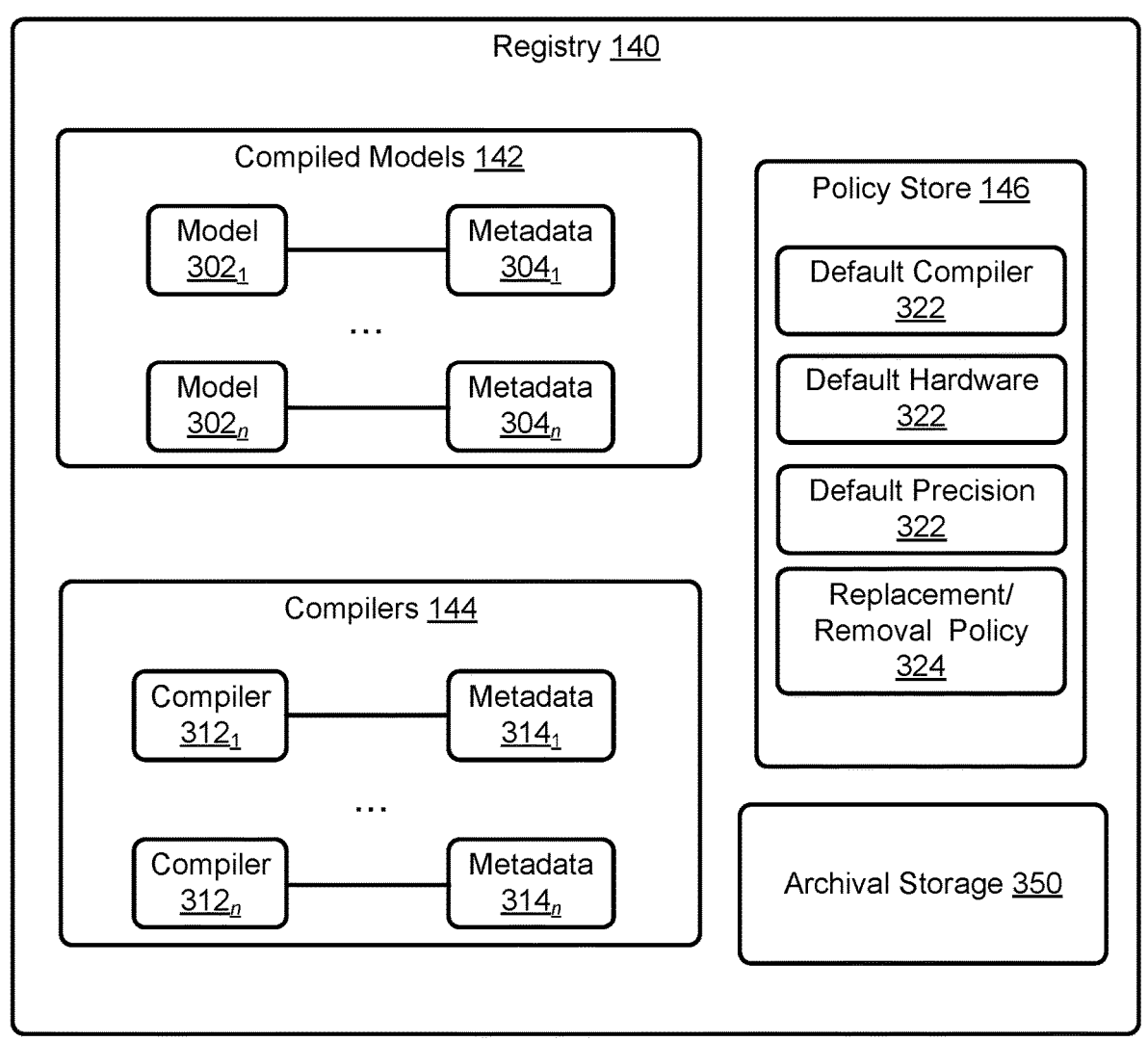
FIG. 3 illustrates an example of a registry related to dynamic centralized model compilation.

FIG. 3 illustrates an example of a registry related to dynamic centralized model compilation. FIG. 3 includes registry 140, compiled models 142, compilers 144, and policy store 146 of FIG. 1.

Compiled models 142 include models $302_{1-n}$, associated with metadata $304_{1-n}$, that indicates attributes of the models. For example, a given model 302 may include a compiled model that was compiled using a compiler stored in registry 140, such as in response to a request from a client (e.g., request 210 of FIG. 2), and its associated metadata 304 may indicate the attributes of the compiled model (e.g., based on the attributes associated with request 210 of FIG. 2 and/or associated with the compiler that was used to produce the compiled model). Examples of attributes indicated in a given item of metadata 304 include the compiler used to generate the compiled model, a precision, hardware attributes (e.g., indications of the types of hardware for which the model was compiled), software attributes (e.g., an operating system and/or application for which the model was compiled), and/or the like.

Compilers 144 include compilers $312_{1-n}$, associated with metadata $314_{1-n}$, that indicates attributes of the compilers. For example, a given compiler 312 may have been added to registry 140, such as by an administrator or application developer/deployer (e.g., via one or more updates 204 of FIG. 2), and its associated metadata 314 may indicate the attributes of the compiler (e.g., the attributes may also be provided via one or more updates 204 of FIG. 2). Examples of attributes indicated in a given item of metadata 304 include the compiler used to generate the compiled model, a precision, hardware attributes (e.g., indications of the types of hardware for which the model was compiled), software attributes (e.g., an operating system and/or application for which the model was compiled), and/or the like.

Policy store 146 stores various policies (e.g., defined via one or more updates 204 of FIG. 2), such as a default compiler 322, default hardware 322, default precision 322, and replacement/removal policy 324. For example, default compiler 322 may specify which of compilers 312 is to be used for a given request if there is no compiler matching attributes associated with the given request. Default hardware 322 may specify the hardware attributes that are to be used for selecting a compiler 312 for a request if there is no compiler matching specific target hardware indicated in the request and/or if no target hardware is specified in the request. Default precision 322 may specify an amount of precision with which a model is to be compiled for a request if there is no precision specified in the request and/or if the precision specified in the request cannot be achieved (e.g., because no compiler supports the specified precision). For example, a compiler may have configurable parameters related to hardware and/or precision, and default values may be used for these configurable parameters if no corresponding values are specified in the request and/or if values specified in the request are not supported by a compiler.

Replacement/removal policy 324 generally specifies conditions under which a compiled model is to be replaced (e.g., re-compiled) or removed from registry 140. For example, a replacement/removal policy 324 may specify that a compiled model is to be removed from registry 140 if it has not been requested for a threshold amount of time. In another example, a replacement/removal policy 324 may specify that a compiled model is to be re-compiled if an updated version of the model or the compiler is added to registry 140. In some embodiments, re-compiled models are stored in registry 140 and/or sent to clients that previously requested the models that were re-compiled.

Registry 140 may also be associated with archival storage 350. For example, compiled models, uncompiled models, and/or compilers historically used to compile models, may be stored in archival storage 350 for some period of time (e.g., based on one or more policies) to enable provenance and/or auditability of the system. In some embodiments, archival storage 350 also stores information about why certain compilers were chosen for compiling certain models (e.g., attributes associated with requests that led to the selection of certain models and/or compilers). For example, archiving such information may be useful for compliance with one or more legal and/or regulatory requirements, and/or to otherwise enable historical compilations to be audited. Archival storage 350 may be a data storage entity such as a database or repository, and may be located within registry 140 and/or may be located outside of registry 140, either on the same physical device or a different physical device (e.g., accessible over a network).

It is noted that the types of policies depicted in policy store 146 and described herein are included as examples, and other types of policies may be defined.

FIG. 4 depicts example operations 400 related to dynamic centralized model compilation. For example, operations 400 may be performed by one or more components of server 130 and/or client device 120 of FIG. 1, such as dynamic model engine 152.

Operations 400 begin at step 402, with receiving, from a client, a request for a machine learning model, wherein the request specifies either one or more attributes comprising one or more of a hardware characteristic, a target precision, or a compiler characteristic or that one or more default behaviors should be used to compile the machine learning model. For example, the request could specify that one or more default behaviors should be used to compile the machine learning model by not including values for one or more attributes (a hardware characteristic, a target precision, a compiler characteristic, and/or the like), by including values of zero or some other specific value for one or more attributes, and/or through some other form of indication.

Certain embodiments further comprise determining that a pre-compiled model corresponding to the one or more attributes is not present in the registry.

Operations 400 continue at step 404, with determining a compiler for the machine learning model based on the one or more attributes, wherein the compiler is stored in a registry. Some embodiments comprise determining that there is no compiler corresponding to the one or more attributes in the registry. For example, in some embodiments the compiler is determined based on one or more default parameters.

Operations 400 continue at step 406, with compiling the machine learning model using the compiler.

Operations 400 continue at step 408, with providing the compiled machine learning model to the client in response to the request.

Some embodiments further comprise storing the compiled machine learning model in the registry in association with metadata that is based on the one or more attributes.

Certain embodiments further comprise receiving an additional request from the client or an additional client specifying at least a subset of the one or more attributes and providing the compiled machine learning model to the client or the additional client in response to the additional request based on the metadata.

Some embodiments further comprise determining that an updated version of the compiler (e.g. that was used to compile the machine learning model) has been added to the registry and re-compiling the machine learning model using the updated version of the compiler. For example, certain embodiments comprise providing the re-compiled machine learning model to the client and/or storing the re-compiled machine learning model in the registry in association with metadata that is based on the one or more attributes. A re-compiled model may be pushed to the client (e.g., based on a stored indication that the client previously requested the model) and/or pulled by the client (e.g., at regular intervals or based on the occurrence of a condition, such as receiving a notification of the re-compiled model), such as according to one or more policies.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and/or the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)-CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims.

In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers. Some embodiments may be implemented in one or more trusted execution environments.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of dynamic model compilation, comprising:
receiving, from a client, a request for a machine learning model, wherein the request indicates either:
one or more attributes comprising one or more of:
a hardware characteristic;
a target precision; or
a compiler characteristic;
one or more default behaviors to be used to compile the machine learning model;
determining that a pre-compiled model corresponding to the one or more attributes is not present in a registry;
determining a compiler for the machine learning model based on the one or more attributes or the one or more default behaviors, wherein the compiler is stored in a the registry;
compiling the machine learning model using the compiler; and
providing the compiled machine learning model to the client in response to the request.

2. The method of claim 1, further comprising storing the compiled machine learning model in the registry in association with metadata that is based on the one or more attributes or the one or more default behaviors.

3. The method of claim 2, further comprising:
receiving an additional request from an additional client specifying at least a subset of the one or more attributes; and
providing the compiled machine learning model to the additional client in response to the additional request based on the metadata.

4. The method of claim 2, further comprising:
storing a plurality of policies in the registry; and
based on one or more of the stored policies, removing or updating the stored, compiled machine learning model from the registry.

5. The method of claim 1, further comprising determining that there is no compiler corresponding to the one or more attributes in the registry, wherein the compiler is determined based on one or more default parameters.

6. The method of claim 1, further comprising:
determining that an updated version of the compiler has been added to the registry; and
re-compiling the machine learning model using the updated version of the compiler.

7. The method of claim 6, further comprising one or more of:
providing the re-compiled machine learning model to the client; or
storing the re-compiled machine learning model in the registry in association with metadata that is based on the one or more attributes or the one or more default behaviors.

8. A system for dynamic model compilation, the system comprising:
at least one memory; and
at least one processor coupled to the at least one memory, the at least one processor and the at least one memory configured to:
receive, from a client, a request for a machine learning model, wherein the request indicates either:
one or more attributes comprising one or more of:
a hardware characteristic;

11 a target precision; or a compiler characteristic;
one or more default behaviors to be used to compile the machine learning model;
determine that a pre-compiled model corresponding to the one or more attributes is not present in a registry;
determine a compiler for the machine learning model based on the one or more attributes or the one or more default behaviors, wherein the compiler is stored in the registry;
compile the machine learning model using the compiler; and
provide the compiled machine learning model to the client in response to the request.

9. The system of claim 8, wherein the at least one processor and the at least one memory are further configured to store the compiled machine learning model in the registry in association with metadata that is based on the one or more attributes or the one or more default behaviors.

10. The system of claim 9, wherein the at least one processor and the at least one memory are further configured to:
receive an additional request from an additional client specifying at least a subset of the one or more attributes; and
provide the compiled machine learning model to the additional client in response to the additional request based on the metadata.

11. The system of claim 9, wherein the at least one processor and the at least one memory are further configured to:
store a plurality of policies in the registry; and
based on one or more of the stored policies, remove or update the stored, compiled machine learning model from the registry.

12. The system of claim 8, wherein the at least one processor and the at least one memory are further configured to determine that there is no compiler corresponding to the one or more attributes in the registry, wherein the compiler is determined based on one or more default parameters.

13. The system of claim 8, wherein the at least one processor and the at least one memory are further configured to:
determine that an updated version of the compiler has been added to the registry; and
re-compile the machine learning model using the updated version of the compiler.

14. The system of claim 13, wherein the at least one processor and the at least one memory are further configured to perform one or more of:
providing the re-compiled machine learning model to the client; or
storing the re-compiled machine learning model in the registry in association with metadata that is based on the one or more attributes or the one or more default behaviors.

15. A non-transitory computer-readable medium storing instructions that, when executed by one or more processors, cause the one or more processors to:
receive, from a client, a request for a machine learning model, wherein the request indicates either:

one or more attributes comprising one or more of:
a hardware characteristic;
a target precision; or a compiler characteristic;
one or more default behaviors to be used to compile the machine learning model;
determine that a pre-compiled model corresponding to the one or more attributes is not present in a registry;
determine a compiler for the machine learning model based on the one or more attributes or the one or more default behaviors, wherein the compiler is stored in the registry;
compile the machine learning model using the compiler; and
provide the compiled machine learning model to the client in response to the request.

16. The non-transitory computer-readable medium of claim 15, wherein the instructions, when executed by the one or more processors, further cause the one or more processors to store the compiled machine learning model in the registry in association with metadata that is based on the one or more attributes or the one or more default behaviors.

17. The non-transitory computer-readable medium of claim 16, wherein the instructions, when executed by the one or more processors, further cause the one or more processors to:
receive an additional request from an additional client specifying at least a subset of the one or more attributes; and
provide the compiled machine learning model to the additional client in response to the additional request based on the metadata.

18. The non-transitory computer-readable medium of claim 16, wherein the instructions, when executed by the one or more processors, further cause the one or more processors to:
store a plurality of policies in the registry; and
based on one or more of the stored policies, remove or update the stored, compiled machine learning model from the registry.

19. The non-transitory computer-readable medium of claim 15, wherein the instructions, when executed by the one or more processors, further cause the one or more processors to determine that there is no compiler corresponding to the one or more attributes in the registry, wherein the compiler is determined based on one or more default parameters.

20. The non-transitory computer-readable medium of claim 15, wherein the instructions, when executed by the one or more processors, further cause the one or more processors to:
determine that an updated version of the compiler has been added to the registry; and
re-compile the machine learning model using the updated version of the compiler.

* * * * *